Aug. 1, 1972  D. ANGELINETTA  3,681,239

DRUM FILTERS

Filed Dec. 17, 1969

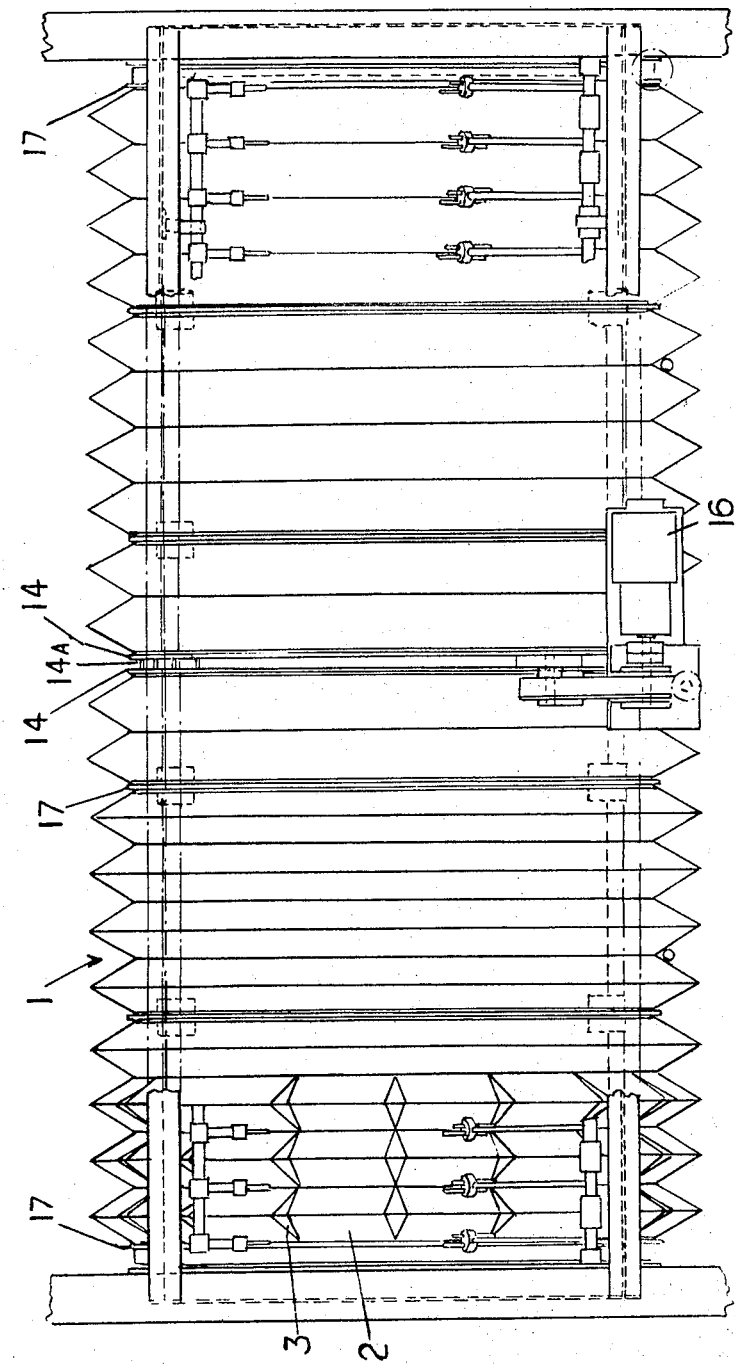

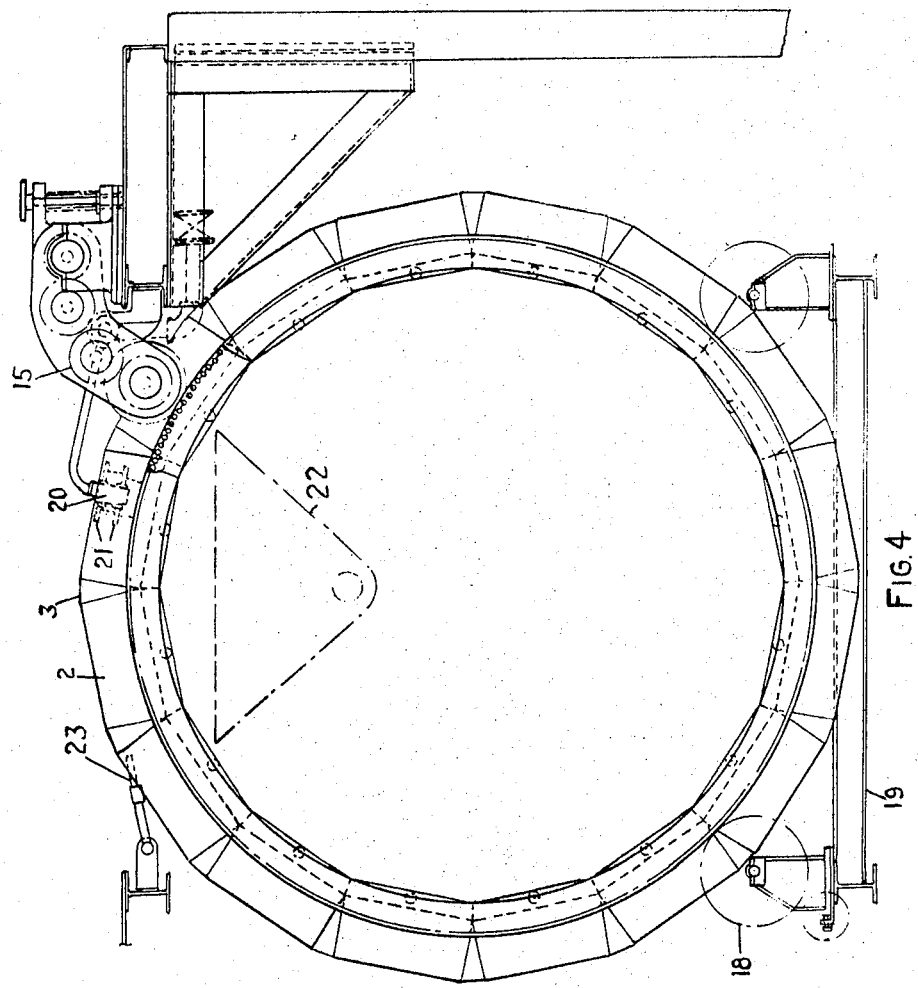

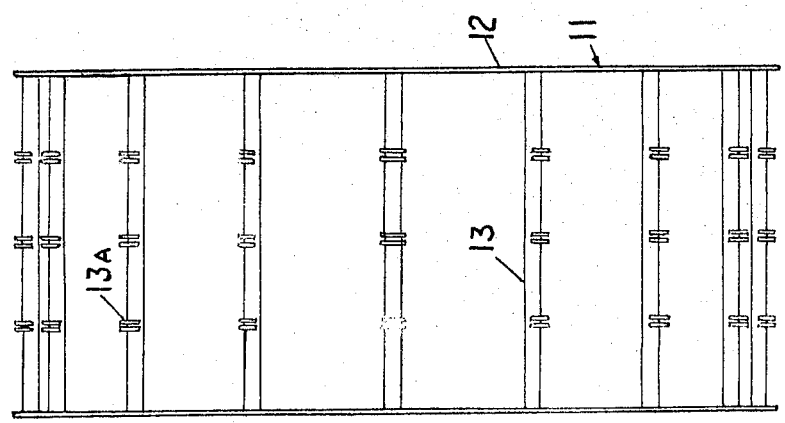
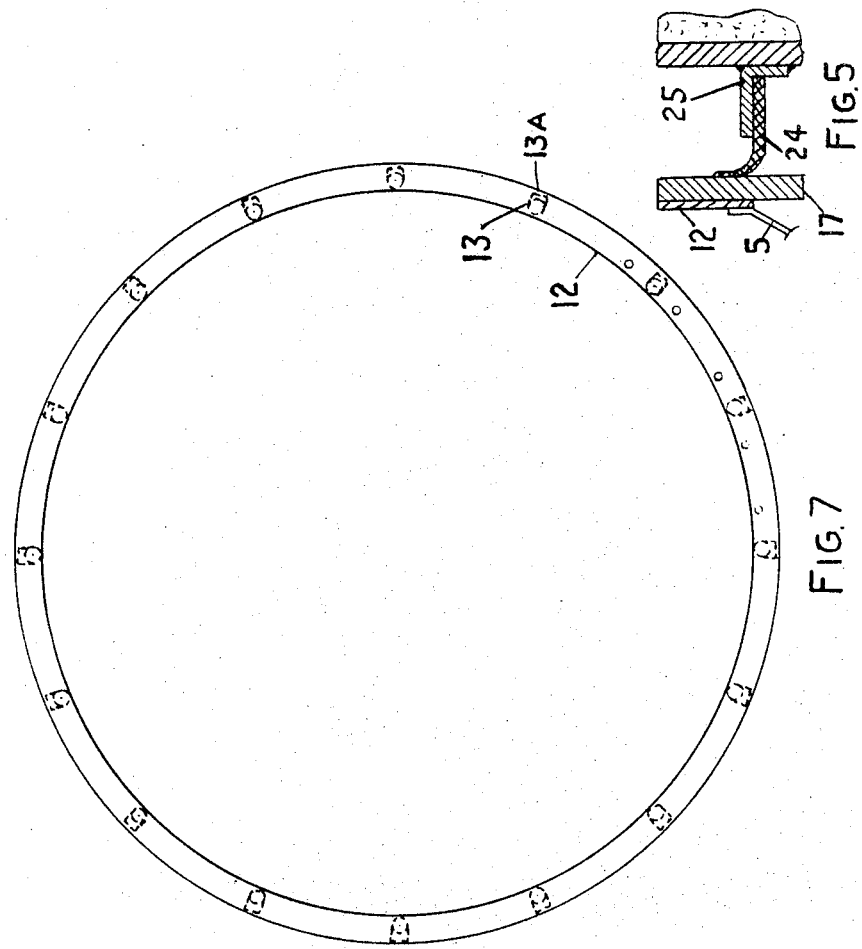

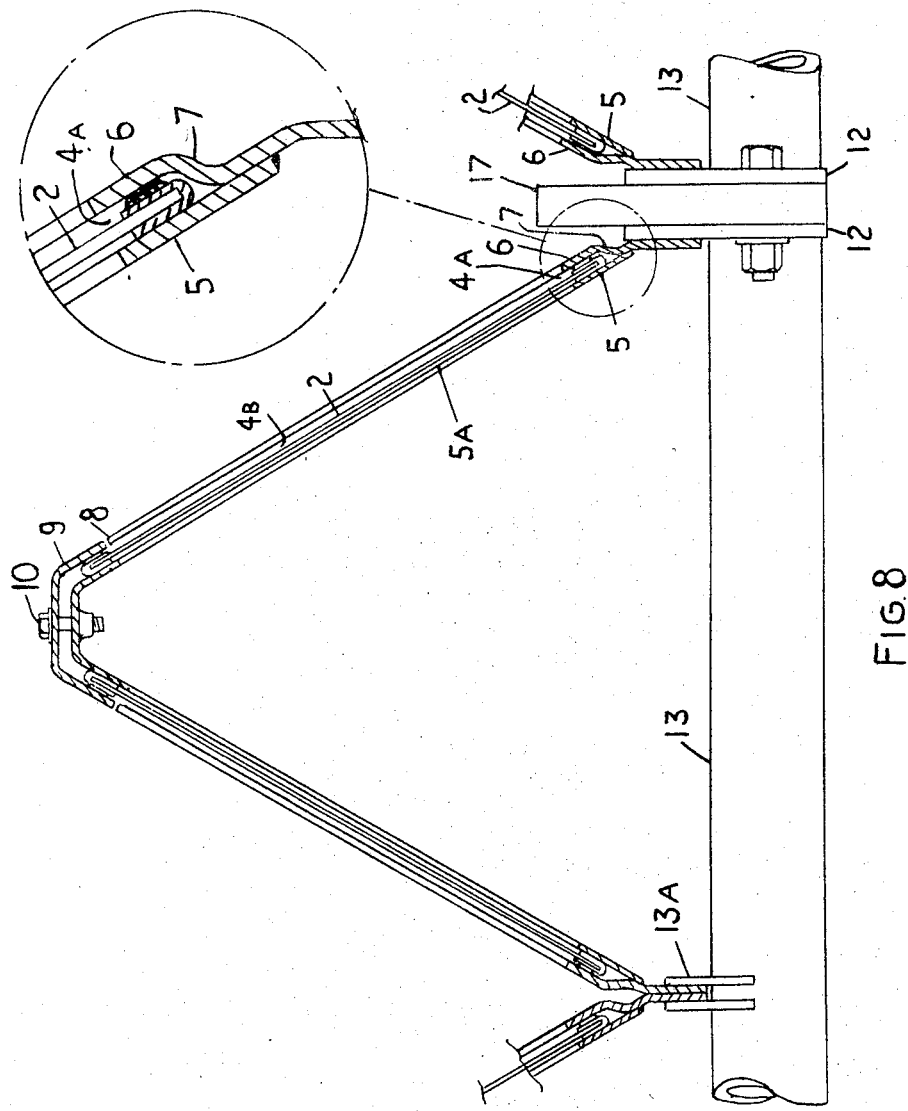

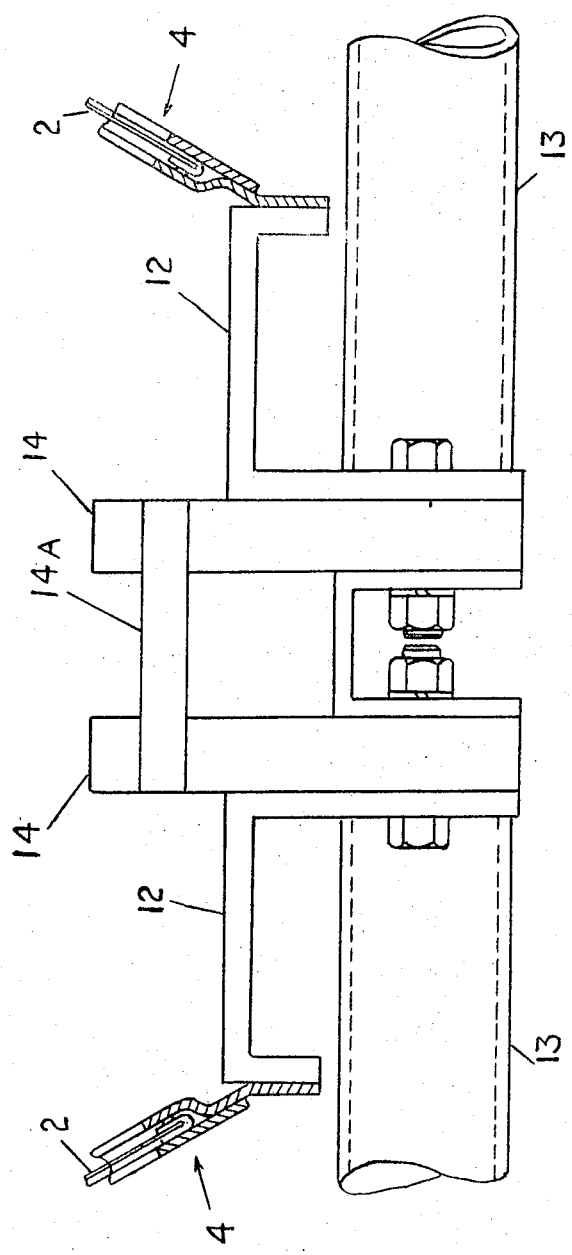

United States Patent Office 3,681,239
Patented Aug. 1, 1972

3,681,239
DRUM FILTERS
Denis Angelinetta, London, England, assignor to Glenfield & Kennedy Limited, Kilmarnock, Ayrshire, Scotland
Filed Dec. 17, 1969, Ser. No. 885,800
Claims priority, application Great Britain, Dec. 17, 1968, 59,827/68
Int. Cl. B01d 33/06
U.S. Cl. 210—402  4 Claims

ABSTRACT OF THE DISCLOSURE

A drum filter includes a filtering drum the peripheral surface of which presents at least one circumferential channel. The sides of the channel are straight and outwardly divergent and the channel is preferably of helical form. The filter further comprises a skeleton frame including a support ring assembly having a plurality of panel supports mounted around the periphery thereof and a plurality of filtering panels of fluid permeable material individually removably mounted on the panel supports.

---

Figure 1:
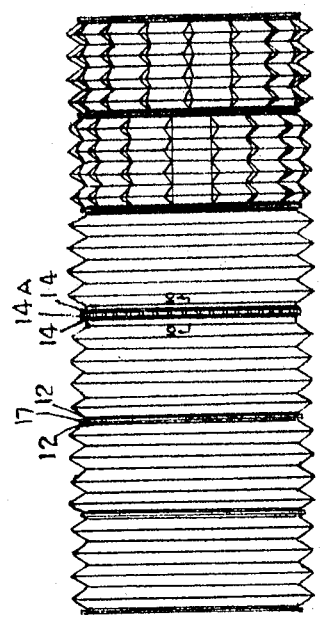

This invention relates to drum filters and particularly to rotary drum filters for the purpose of straining and filtering fluids.

A drum filter according to the invention consists of a drum the peripheral surface of which presents at least one circumferential channel the sides of which appear in cross section as straight and outwardly divergent, the sides of the channel being permeable to fluid.

The drum may incorporate a plurality of endless channels or may incorporate one channel only of helical form or several channels each of helical form extending along the length of the drum.

The sides of the or each channel may be made up of arcuate panels of fluid-permeable material so that the channel viewed axially of the drum is truly circular. Alternatively the sides of each channel may be made up of planar rectangular panels of fluid permeable material so that each side of the channel consists of a number of facets.

The bottom of the or each channel may be constituted by the corner formed by the meeting of the sides of the channel. Alternatively the bottom of the or each channel may be formed of arcuate or straight panels meeting the side panels along their longitudinal edges.

The drum may incorporate a frame to which the panels are attachable.

Conveniently the frame may be a skeleton frame consisting of at least one support ring assembly carrying mounted around its periphery panel supports each formed to support one panel.

The support ring assembly may consist of two spaced end rings connected to one another by spaced tubular spacers so that the assembly resembles a squirrel cage.

Each panel support may consist of inner and outer apertured frame members fastened to one another in spaced relation, the inner member having in cross section the form of the upstanding sides of an equilateral triangle and an outer member being fastened to each side to form between the members on each side a groove at the base end and two upstanding side grooves, and a clip attachable to the inner member at the apex to provide when in place a top groove between the clip and the inner member on each side of the apex, a panel being insertable into the grooves on each side of the apex.

The tubular spacers may carry lugs to which the base ends of the inner members between the ends of the support ring assembly are attached, the base ends of the inner members at the ends of the assembly being attached to the end rings.

Each panel support may be rectangular when viewed axially of the drum, the triangular gaps between adjacent supports being closed by angled fluid-impermeable connecting pieces.

Several support ring assemblies may be fastened to one another co-axially of one another to make a drum of the desired length.

A drum support ring may be fastened to the end rings of the assembly or between the adjacent assemblies where several assemblies are fastened together, the drum support rings being engageable with drum supporting means.

The drum may be formed for admission of fluid to be strained at one or both ends. Each end of the drum may incorporate an annular surface engageable by a flexible stationary annular sealing strip to prevent escape of fluid from the interior of the drum.

Conveniently the pitch of the channels is equal to the height of each channel.

The drum may be mounted on a shaft.

The drum may be associated with a supporting structure presenting at each end of the drum a nest of parallel rollers the axes of which are equidistantly spaced around the centre of the drum over an angle not exceeding 90°, the drum resting on these rollers which thus constitute drum-supporting means. At least one retaining roller may be provided at the top of the drum at each end of the drum to prevent lifting of the drum.

For driving the drum the drum may be furnished with a gear ring encircling the drum around the circumference of the drum. The gear ring is preferably located mid-way along the drum and may consist of two gear elements in the form of rings held in spaced relation by pins equally spaced circumferentially and fastened to one end ring of a support ring assembly, or may be interposed between adjacent support ring assemblies, each gear element being attached to the adjacent end ring of the adjacent assembly, the gear elements and the pins constituting a gear wheel co-axial with the drum and engageable with a driving pinion or a driving band.

The supporting structure may carry nozzles directed towards the surface of the drum and connectible to a source of supply of washing fluid under pressure.

The drum may contain a washing fluid receiving trough located to be opposite the nozzles, with the filtering panels between the trough and the nozzles. The trough may be counterbalanced on a shaft so that it remains opposite the nozzles during rotation of the drum.

The panels may be perforated strips of metal or other sheet material or may be of foraminous material or may be panels of wire mesh, and may be mounted in frames of sealing material.

Figure 2:
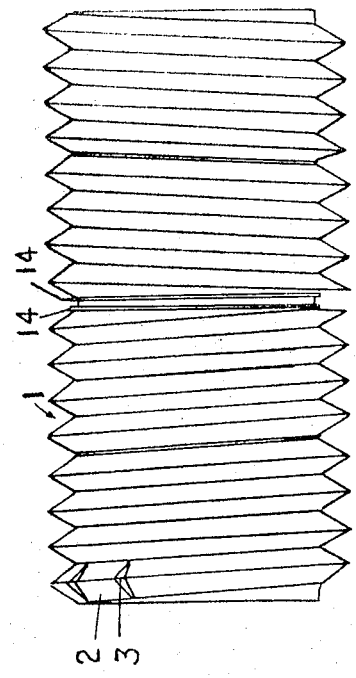

A practical embodiment of the invention is illustrated in the accompanying drawings in which FIG. 1 illustrates a drum containing a plurality of endless channels lying side by side; FIG. 2 illustrates a drum incorporating one channel only of helical form, the convolutions lying side by side; FIG. 3 is a plan view of a drum filter incorporating a drum as illustrated in FIG. 1; FIG. 4 is a section through the line 4—4 in FIG. 3, also the line 4—4 in FIG. 1; FIG. 5 is a larger scale section of the seal at the ends of the drum and is of the portion circled in FIG. 3; FIG. 6 illustrates a support ring assembly constituting a section of the drum frame; FIG. 7 is an end view of the support ring assembly of FIG. 6; FIG. 8 illustrates a screen support in cross section and shows how the support is fastened to a support ring assembly, FIG. 9 is a side view of a screen support looking in a direction axially of the drum, and FIG. 10 is a section through 10—10 in FIG. 1 showing the arrangement for driving the drum.

Figure 9:
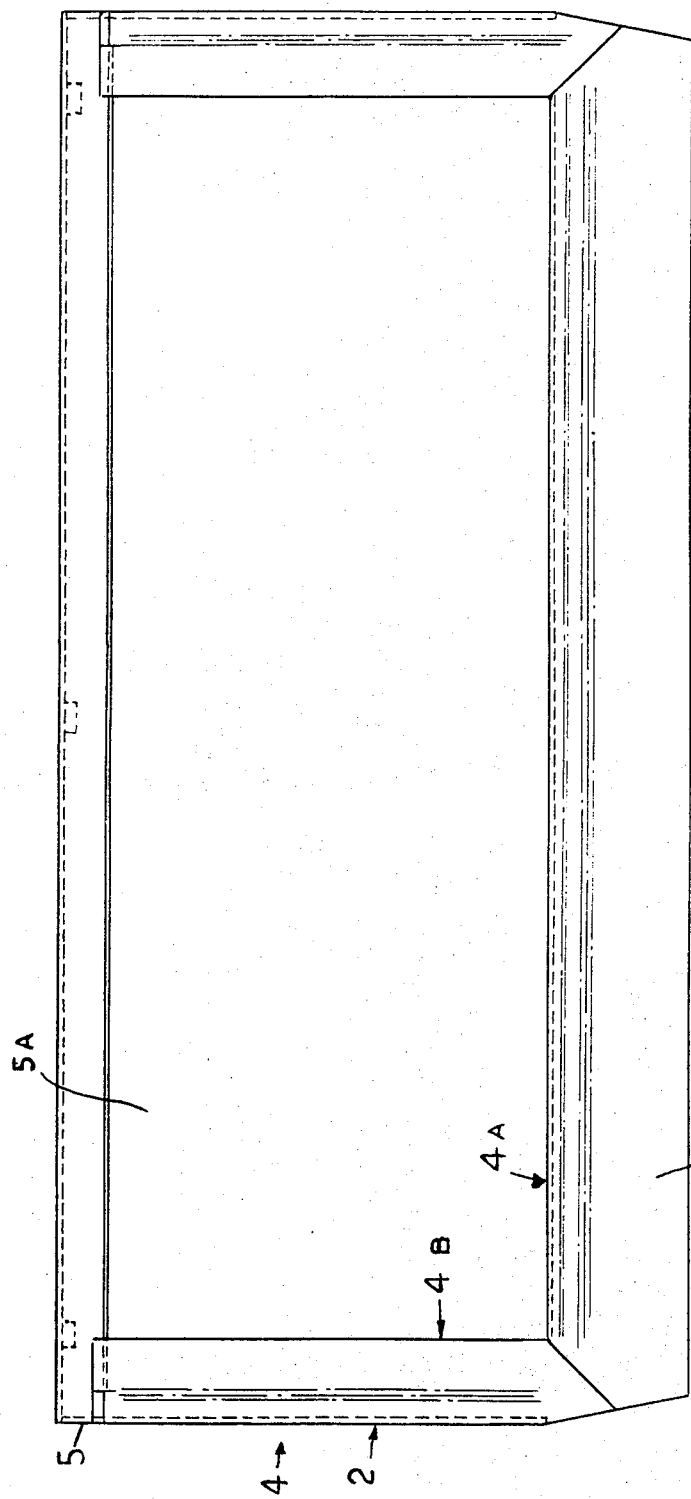

In the drawings, the drum consists of a plurality of endless channels 1 in side by side relationship, the sides of each channel being made up of separate panels 2 of fluid-permeable material, each panel being planar and being rectangular in shape as can be understood from reference to FIGS. 8 and 9 so that each side of each channel consists of a number of facets as is obvious from FIGS. 1 and 4. The tapered spaces between adjacent panels on opposite sides of each ridge between adjacent channels are filled by angled connecting pieces 3 which are not fluid permeable. The channels of all the drums illustrated have walls made up of planar panels but these are illustrated only on the right-hand end of FIG. 1 to simplify the drawings. The panels are carried by a skeleton frame to which the panels are removably attached. The frame consists of a series of panel supports 4 each in cross section having the shape of the upstanding sides of an equilateral triangle, each sloping side being formed to present a groove 4A at the base end of that side and two grooves 4B upstanding from the base. The grooves are formed by inner and outer frame members 5 and 6 fastened to one another, the members being of plate material. The member 6 is joggled at 7. The member 5 is formed with an aperture 5A and continues up over the apex 5B but the member 6 which presents an opening between the portions forming the grooves 4B stops short at the points 8, the groove being completed by a clip 9 attachable over the apex 5B and arranged to be held in place to the member 5 by screws 10 passing through the apex. A panel 2 of fluid-permeable material is shown resting in the grooves 4A and 4B presented between the members 5 and 6 and held in place by the clip 9. The panel 2 is inserted by sliding it into place with the clip 9 removed, the panel 2 being readily slidable into the grooves 4A and 4B. When the panel 2 is in place the clip 9 is fitted on top and the screw 10 inserted so that the panel 2 is retained in its position. The panel 2 can be equally readily removed. The panel supports 4 are fastened to support ring assemblies 11 each consisting of two end rings 12 joined by tubular spacers 13 presenting lugs 13A, the panel supports 4 being fastened to the tubular spacers 13 by attachment of the base ends of the inner members 5 to the lugs 13A and the end rings 12. A drum of the desired length is made up by fitting co-axially to one another the requisite number of assemblies 11. For the purpose of rotating the drum two half drum portions are joined together by the arrangement illustrated in FIG. 10. As is shown in FIG. 10 the two end rings 18 of adjacent assemblies 11 are fastened to driving gear elements 14 in the form of rings joined by pins 14A equally spaced circumferentially, the rings 14 and the pins 14A together constituting a gear wheel co-axial with the drum. A gear train 15 connects the gear wheel 14, 14A with a driving motor 16. 17 denotes drum support rings located between and connected to the end rings 12 of adjacent support ring assemblies 11, the drum support rings 17 resting on rollers 18 carried by a base 19. 20 denotes nozzle heads carrying nozzles 21 connected to a source of supply of washing fluid and 22 denotes a collecting trough located within the drum and arranged to receive washing fluid which has passed through the panels 2. 23 denotes ultra-violet ray lamps which subject the filters to ultra-violet radiation during operation of the apparatus for germicidal purposes. At each end of the drum a stationary flexible annular sealing strip 24 is supported by a fixed end plate 25 on the base frame 19 and rests against the adjacent drum support ring 17 thereby providing a liquid seal.

In the construction employing a drum as illustrated in FIG. 1 the inner and outer frame members are formed as rings. In the construction employing a drum as illustrated in FIG. 2 the inner and outer frame members are formed as helices. Othewise the constructions for the two forms of drum are identical.

In practice, the channels 1 provide a considerably increased filtering surface over that available in a drum of normal construction while individual panels 2 are easily removed and replaced by removal of the appropriate clips 9, the panel or panels 2 to be changed then being lifted out and a new panel or panels substituted by replacement of the clip or clips 9. The faceted construction particularly permits the use of cheaply produced planar panels. The construction incorporating one helical channel or several helical channels as illustrated in FIG. 2 assists in distributing the fluid to be filtered over the inner surface of the drum since during rotation of the drum fluid is moved axially along the drum by the screwing action of the helical channel or channels.

I claim:

1. A drum filter comprising a filtering drum the peripheral surface of which presents at least one circumferential channel the sides of which are straight and outwardly divergent, said drum comprising at least first and second end rings and a plurality of tubular spacers mounted around the periphery of said drum for connecting said end rings together, said spacers carrying mounting means for panel supports peripherally mounted around the drum surface defined by said tubular spacers, said support panels each comprising inner and outer apertured frame members fastened to one another in spaced relationship, each said inner member being in the form of an equilateral triangle in cross section with an outer member fastened to each side to form between the members on each side thereof a bottom groove and two upstanding side grooves, and a clip attachable to the inner member at the apex to provide, when in place, a top groove between the clip and the inner member on each side of the apex, and filtering panels of fluid permeable material removably mounted one on each panel support and being insertable into the grooves on each side of the apex.

2. A drum filter as claimed in claim 1 in which the tubular spacers carry lugs to which the base ends of the inner members between the ends of the support ring assembly are attached, the base ends of the inner members at the ends of the assembly being attached to the end rings.

3. A drum filter as claimed in claim 1 in which at least three end rings are fastened together in seriatim by tubular spacers, to form a drum of a desired length.

4. A drum filter as claimed in claim 3 wherein said end rings and tubular spacers constitute support ring assemblies, said filter further including a driving gear wheel comprising first and second gear rings and a plurality of circumferentially equally spaced pins for holding the gear rings in spaced relationship, said driving gear wheel being interposed between adjacent support ring assemblies and each gear ring being attached to the adjacent end ring of the adjacent assembly.

References Cited

UNITED STATES PATENTS

| 2,593,707 | 4/1952 | Walker | 210—402 |
| 2,454,134 | 11/1948 | Burleson | 210—402 |
| 1,496,517 | 6/1924 | Bohem | 210—402 X |
| 1,650,434 | 11/1927 | Daman | 210—403 X |
| 3,353,675 | 11/1967 | Glos II | 210—404 X |
| 1,870,442 | 8/1932 | Coley | 210—403 X |
| 2,055,119 | 9/1936 | Clendening | 210—402 X |

FOREIGN PATENTS

| 6,852 | 1/1898 | Norway | 210—402 |
| 194,862 | 9/1956 | Sweden | 210—404 |

REUBEN FRIEDMAN, Primary Examiner

T. A. GRANGER, Assistant Examiner